United States Patent
Kuo et al.

(10) Patent No.: US 6,728,529 B2
(45) Date of Patent: Apr. 27, 2004

(54) PREVENTING EXCESSIVE USE OF SECURITY KEYS IN A WIRELESS COMMUNICATIONS SECURITY SYSTEM

(75) Inventors: Richard Lee-Chee Kuo, Hsin-Chu (TW); Chi-Fong Ho, Hsin-Chu Hsien (TW); Sam Shiaw-Shiang Jiang, Hsin-Chu (TW)

(73) Assignee: ASUSTeK Computer Inc., Taipei (TW)

( * ) Notice: Subject to any disclaimer, the term of this patent is extended or adjusted under 35 U.S.C. 154(b) by 301 days.

(21) Appl. No.: 09/682,311

(22) Filed: Aug. 16, 2001

(65) Prior Publication Data

US 2003/0036377 A1 Feb. 20, 2003

(51) Int. Cl.$^7$ .................................................. H04M 3/16
(52) U.S. Cl. ..................... 455/411; 455/410; 455/412.1; 455/422.1; 455/403
(58) Field of Search ................................ 455/410, 411, 455/412.1, 422.1, 403

(56) References Cited

U.S. PATENT DOCUMENTS 6,081,601 A * 6/2000 Raivisto ..................... 380/270
6,157,826 A * 12/2000 Lee ............................. 455/411
6,473,613 B2 * 10/2002 Beamish et al. .......... 455/435.1

OTHER PUBLICATIONS

3GPP TS 25.331 V3.7.0 Jun. 2001 (8.5.9/8.6.4/8.6.4.1/ 8.6.4.2/8.6.4.3).
3GPP TS 33.102 V3.9.0 Jun. 2001 (6.4.3/6.4.8/6.6.4/6.6.4.1/ 6.5.4.1).

* cited by examiner

Primary Examiner—Edward F. Urban
Assistant Examiner—Duy K Le
(74) Attorney, Agent, or Firm—Winston Hsu

(57) ABSTRACT

A start value is x bits in size and is used to provide an initial value to an n-bit security count value. A wireless communications device establishes channels with a compatible device, and releases channels established with the compatible device. For every channel established by the wireless communications device, a corresponding terminal value is obtained. A terminal value for a channel is the highest value reached by the x most significant bits ($MSB_x$) of an n-bit security count value associated with the channel. The security count value is used to encipher data transmitted along the channel. A final value that is obtained that is the greatest value of all the terminal values. Finally, a start value is stored in the memory of the wireless device that is at least as large as the final value.

11 Claims, 2 Drawing Sheets

US 6,728,529 B2

PREVENTING EXCESSIVE USE OF SECURITY KEYS IN A WIRELESS COMMUNICATIONS SECURITY SYSTEM

BACKGROUND OF INVENTION

1. Field of the Invention

The present invention relates to security count values in a wireless communications system. In particular, the present invention discloses a method for ensuring that security counts generated by a hyper-frame number are re-used as little as possible over the lifetime of a security key.

2. Description of the Prior Art

Please refer to FIG. 1. FIG. 1 is a simplified block diagram of a prior art wireless communications system. The wireless communications system includes a first station 10 in wireless communications with a second station 20. As an example, the first station 10 could be a mobile unit, such as a cellular telephone, and the second station 20 could be a base station. The first station 10 communicates with the second station 20 over a plurality of channels 12. The second station 20 thus has corresponding channels 22, one for each of the channels 12. Each channel 12 has a receiving buffer 12r for holding protocol data units (PDUs) 11r received from the corresponding channel 22 of the second station 20. Each channel 12 also has a transmitting buffer 12t for holding PDUs 11t that are awaiting transmission to the corresponding channel 22 of the second station 20. A PDU 11t is transmitted by the first station 10 along a channel 12 and received by the second station 20 to generate a corresponding PDU 21r in the receiving buffer 22r of the corresponding channel 22. Similarly, a PDU 21t is transmitted by the second station 20 along a channel 22 and received by the first station 10 to generate a corresponding PDU 11r in the receiving buffer 12r of the corresponding channel 12.

For the sake of consistency, the data structures of each PDU 11r, 11t, 21r and 21t along corresponding channels 12 and 22 are identical. That is, a transmitted PDU 11t generates an identical corresponding received PDU 21r, and vice versa. Furthermore, both the first station 10 and the second station 20 use identical PDU 11t, 21t data structures. Although the data structure of each PDU 11r, 11t, 21r and 21t along corresponding channels 12 and 22 is identical, different channels 12 and 22 may use different PDU data structures according to the type of connection agreed upon along the corresponding channels 12 and 22. In general, though, every PDU 11r, 11t, 21r and 21t will have a sequence number 5r, 5t, 6r, 6t. The sequence number 5r, 5t, 6r, 6t is an m-bit number that is incremented for each PDU 11r, 11t, 21r, 21t. The magnitude of the sequence number 5r, 5t, 6r, 6t thus indicates the sequential ordering of the PDU 11r, 11t, 21r, 21t in its buffer 12r, 12t, 22r, 22t. The sequence number 5t, 6t is often explicitly carried by the PDU 11t, 21t, but may also be implicitly assigned by the station 10, 20. For example, in an acknowledged mode setup for corresponding channels 12 and 22, each transmitted PDU 11t, successful reception of which generates an identical corresponding PDU 21r, is explicitly confirmed by the second station 20. A 12-bit sequence number 5t is explicitly carried by each PDU 11t. The second station 20 scans the sequence numbers 6r embedded within the received PDUs 21r to determine the sequential ordering of the PDUs 21r, and to determine if any PDUs 21r are missing. The second station 20 can then send a message to the first station 10 that indicates which PDUs 21r were received by using the sequence numbers 6r of each received PDU 21r, or may request that a PDU 11t be re-transmitted by specifying the sequence number 5t of the PDU 11t to be re-transmitted. Alternatively, in a so-called transparent transmission mode, data is never confirmed as successfully received. The sequence numbers 5t, 6t are not explicitly carried in the PDUs 11t, 21t. Instead, the first station 10 simply internally assigns a 7 bit sequence number 5t to each PDU 11t. Upon reception, the second station 20 similarly assigns a 7-bit sequence number 6r to each PDU 21r. Ideally, the sequence numbers 5t maintained by the first station 10 for the PDUs 11t are identical to the corresponding sequence numbers 6r for the PDUs 21r that are maintained by the second station 20.

Hyper-frame numbers (HFNs) are also maintained by the first station 10 and the second station 20. Hyper-frame numbers may be thought of as high-order bits of the sequence numbers 5t, 6t that are never physically transmitted with the PDUs 11t, 21t, except in rare cases of special signaling PDUs 11t, 21t that are used for synchronization. And in these cases, the HFNs are not carried as part of the sequence number 11t, 21t, but instead are carried in fields of the data payload of the signaling PDU 11t, 21t, and thus are more properly signaling data. As each transmitted PDU 11t, 21t generates a corresponding received PDU 21r, 11r, hyper-frame numbers are also maintained for received PDUs 11r, 21r. Each channel 12 of the first station 10 thus has a receiving hyper-frame number ($HFN_R$) 13r and a transmitting hyper-frame number ($HFN_T$) 13t. Similarly, the corresponding channel 22 on the second station 20 has a $HFN_R$ 23r and a $HFN_T$ 23t. When the first station 10 detects roll-over of the sequence numbers 5r of PDUs 11r in the receiving buffer 12r, the first station 10 increments the $HFN_R$ 13r. On roll-over of sequence numbers 5t of transmitted PDUs 11t, the first station 10 increments the $HFN_T$ 13t. A similar process occurs on the second station 20 for the $HFN_R$ 23r and $HFN_T$ 23t. The $HFN_R$ 13r of the first station 10 should thus be synchronized with (i.e., identical to) the $HFN_T$ 23t of the second station 20. Similarly, the $HFN_T$ 13t of the first station 10 should be synchronized with (i.e., identical to) the $HFN_R$ 23r of the second station 20.

The PDUs 11t and 21t are not transmitted "out in the open". A security engine 14 on the first station, and a corresponding security engine 24 on the second station 20, are together used to ensure secure and private exchanges of data exclusively between the first station 10 and the second station 20. The security engine 14, 24 has two primary functions. The first is the obfuscation (i.e., ciphering, or encryption) of data held within a PDU 11t, 21t so that the PDU 11t, 21t presents a meaningless collection of random numbers to an eavesdropper. The second is to verify the integrity of data contained within the PDUs 11r, 21r. This is used to prevent another, improper, station from masquerading as either the first station 10 or the second station 20. By verifying data integrity, the first station 10 can be certain that a PDU 11r was, in fact, transmitted by the second station 20, and vice versa. For a PDU 11t to be transmitted, the security engine 14 uses, amongst other inputs, an n-bit security count 14c and a key 14k to perform the ciphering functions to the PDU 11t. To properly decipher the corresponding PDU 21r, the security engine 24 must use an identical security count 24c and key 24k. Similarly, data integrity checking on the first station 10 uses an n-bit security count that must be synchronized with a corresponding security count on the second station 20. As the data integrity security count is generated in a manner similar to that for the ciphering security count 14c, 24c, and as ciphering is more frequently applied, the ciphering security count 14c, 24c is considered in the following. The keys 14k and 24k remain constant across all PDUs 11t and 21t (and thus corresponding PDUs 21r and 11r), until explicitly changed by both the first station 10 and the second station 20. The security counts 14c and 24c, however, continuously change with each PDU 11t and 21t. This constant changing of the security count 14c, 24c makes decrypting (and spoofing) of PDUs 11t, 21t more difficult, as it reduces statistical consistency of inputs into the security engine 14, 24. The security count 14c for a PDU 11t is generated by using the sequence number 5t of the PDU 11t as the low order bits of the security count 14c, and the $HFN_T$ 13t associated with the sequence number 5t as the high order bits of the security count 14c. Similarly, the security count 14c for a PDU 11r is generated from the sequence number 5r of the PDU 11r and the $HFN_R$ 13r of the PDU 11r. An identical process occurs on the second station 20, in which the security count 24c is generated using the sequence number 6r, 6t and the appropriate $HFN_R$ 23r or $HFN_T$ 23t. The security count 14c, 24c has a fixed bit size, say 32 bits. As the sequence numbers 5r, 6r, 5t, 6t may vary in bit size depending upon the transmission mode used, the hyper-frame numbers $HFN_R$ 13r, $HFN_R$ 23r, $HFN_T$ 13t and $HFN_T$ 23t must vary in bit size in a corresponding manner to yield the fixed bit size of the security count 14c, 24c. For example, in a transparent transmission mode, the sequence numbers 5r, 6r, 5t, 6t are all 7 bits in size. The hyper-frame numbers $HFN_R$ 13r, $HFN_R$23r, $HFN_T$ 13t and $HFN_T$ 23t are thus 25 bits in size; combining the two together yields a 32 bit security count 14c, 24c. In an acknowledged transmission mode, the sequence numbers 5r, 6r, 5t, 6t are all 12 bits in size. The hyper-frame numbers $HFN_R$ 13r, $HFN_R$ 23r, $HFN_T$ 13t and $HFN_T$ 23t are thus 20 bits in size so that combining the two together continues to yield a 32 bit security count 14c, 24c.

Initially, there are no established channels 12 and 22 between the first station 10 and the second station 20. The first station 10 thus establishes a channel 12 with the second station 20. To do this, the first station 10 must determine an initial value for the $HFN_T$ 13t and $HFN_R$ 13r. The first station 10 references a non-volatile memory 16, such as a flash memory device or a SIM card, for a start value 16s, and uses the start value 16s to generate the initial value for the HFNT 13t and the $HFN_R$ 13r. The start value 16s holds the x most significant bits ($MSB_X$) of a hyper-frame number from a previous session along a channel 12. Ideally, x should be at least as large as the bit size of the smallest-sized hyper-frame number (i.e., for the above example, x should be at least 20 bits in size). The MSB of the $HFN_T$ 13t and the $HFN_R$ 13r are set to the start value 16s, and the remaining low order bits are set to zero. The first station 10 then transmits the start value 16s to the second station 20 (by way of a special signaling PDU 11t) for use as the $HFN_R$23r and the $HFN_T$ 23t. In this manner, the $HFN_T$ 13t is synchronized with the $HFN_R$ 23r, and the $HFN_T$ 23t is synchronized with the $HFN_R$ 13r.

As noted, the first station 10 may establish a plurality of channels 12 with the second station 20. Each of these channels 12 uses its own sequence numbers 5r and 5t, and hyper-frame numbers 13r and 13t. When establishing a new channel 12, the first station 10 considers the $HFN_T$ 13t and $HFN_R$ 13r of all currently established channels 12, selecting the $HFN_T$ 13t or $HFN_R$ 13r with the highest value. The first station 10 then extracts the $MSB_X$ of this highest-valued hyper-frame number 13r, 13t, increments the $MSB_X$ by one, and uses it as the $MSB_X$ for the new $HFN_T$ 13t and $HFN_R$ 13r for a newly established channel 12. Synchronization is then performed between the first station 10 and the second station 20 to provide the $MSB_X$ to the second station 20 for the $HFN_R$ 23r and $HFN_T$ 23t. In this manner, a constantly incrementing spacing is ensured between the security counts 14c of all established channels 12.

It is noted that, for the sake of security, the keys 14k and 24k should be changed after a predetermined interval. This interval is determined by the security count 14c, 24c. When the security count 14c, 24c exceeds a predetermined value, the first station 10 and second station 20 initiate a security command to change the keys 14k and 24k. For the security count 14c, 24c to reach the predetermined value, a hyper-frame number must be remembered between sessions (that is, remembered between when the first station 10 is turned off and then turned back on again), which is the purpose of the start value 16s. When the very last channel 12 is released (i.e., terminated, so that no more channels 12 are established with the second station 20), the $MSB_X$ of the $HFN_T$ 13t or $HFN_R$ 13r for this channel 12 are extracted (depending on which is the larger, $HFN_T$ 13t or $HFN_R$ 13r), incremented by one, and then saved in the start value 16s. When the first station 10 is turned back on again, and seeks to establish a channel 12, the first station 10 uses the start value 16s, and the security count 14c is thus ensured to continuously rise.

Unfortunately, using the $HFN_T$ 13t or $HFN_R$ 13r of the very last released channel 12 to generate the start value 16s can lead to excessive delays in the changing of the security key 14k. As a matter of routine, the first station 10 establishes a signaling channel 12 with the second station 20. This signaling channel 12 is used to carry special signaling PDUs 11t for the communications protocol, and is established quite early on after the first station 10 is turned on. Signaling channels 12 tend to have a long duration, but generally do not carry much data. Thus, both the $HFN_T$ 13t and the $HFN_R$ 13r of the signaling channel 12 will have relatively small values, as the hyper-frame numbers 13t, 13r are created early on and are infrequently incremented due to low PDU 11t, 11r traffic loads. On the other hand, data channels 12 may be established sporadically and have high PDU 11t, 11r throughput. The $HFN_T$ 13t, or $HFN_R$ 13r, of such a data channel 12 may thus become quite large in comparison to that of the signaling channel 12. However, once a data channel 12 has fulfilled its function it is released. More likely than not, the signaling channel 12 will continue to exist, and so the hyper-frame numbers 13t, 13r associated with the data channel 12 are lost. Though a data channel 12 may have much larger hyper-frame numbers 13t, 13r than the signaling channel 12, it is the signaling channel 12 that is finally the last channel 12 to be released, and so it is the $HFN_T$ 13t, or $HFN_R$ 13r, of the signaling channel 12 that is used to generate the start value 16s. This leads to an excessive re-use of hyper-frame number 13t, 13r values, and hence unnecessary delays between the changing of the security key 14k. Security on the channels 12 is consequently weakened.

SUMMARY OF INVENTION

It is therefore a primary objective of this invention to provide a method for determining a start value to be stored in a memory of a wireless communications device.

Briefly summarized, the preferred embodiment of the present invention discloses a method for storing and managing a start value in a wireless communications device. The start value is x bits in size and is used to provide an initial value to an n-bit security count value. The wireless communications device is capable of establishing a plurality of channels and capable of releasing established channels. For every channel established by the wireless communications device, a corresponding terminal value is obtained. A terminal value for a channel is the highest value reached by the x most significant bits ($MSB_x$) of an n-bit security count value associated with the channel. A final value is obtained that is the greatest value of all the terminal values. Finally, a start value is stored in the memory of the wireless device that is at least as large as the final value.

It is an advantage of the present invention that by saving the largest $MSB_x$ of all the n-bit security count values associated with all the established channels, the present invention method reduces re-use of security count values, and encourages a more rapid changing of security keys. A minimum re-use of security count values is obtained, while maintaining a maximum security key usage. Overall transmission security is enhanced by avoiding unnecessary delays to the changing of the security key.

These and other objectives of the present invention will no doubt become obvious to those of ordinary skill in the art after reading the following detailed description of the preferred embodiment, which is illustrated in the various figures and drawings.

DETAILED DESCRIPTION

In the following description, a station may be a mobile telephone, a handheld transceiver, a base station, a personal data assistant (PDA), a computer, or any other device that requires a wireless exchange of data. It should be understood that many means may be used for the physical layer to effect wireless transmissions, and that any such means may be used for the system hereinafter disclosed.

Figure 1:
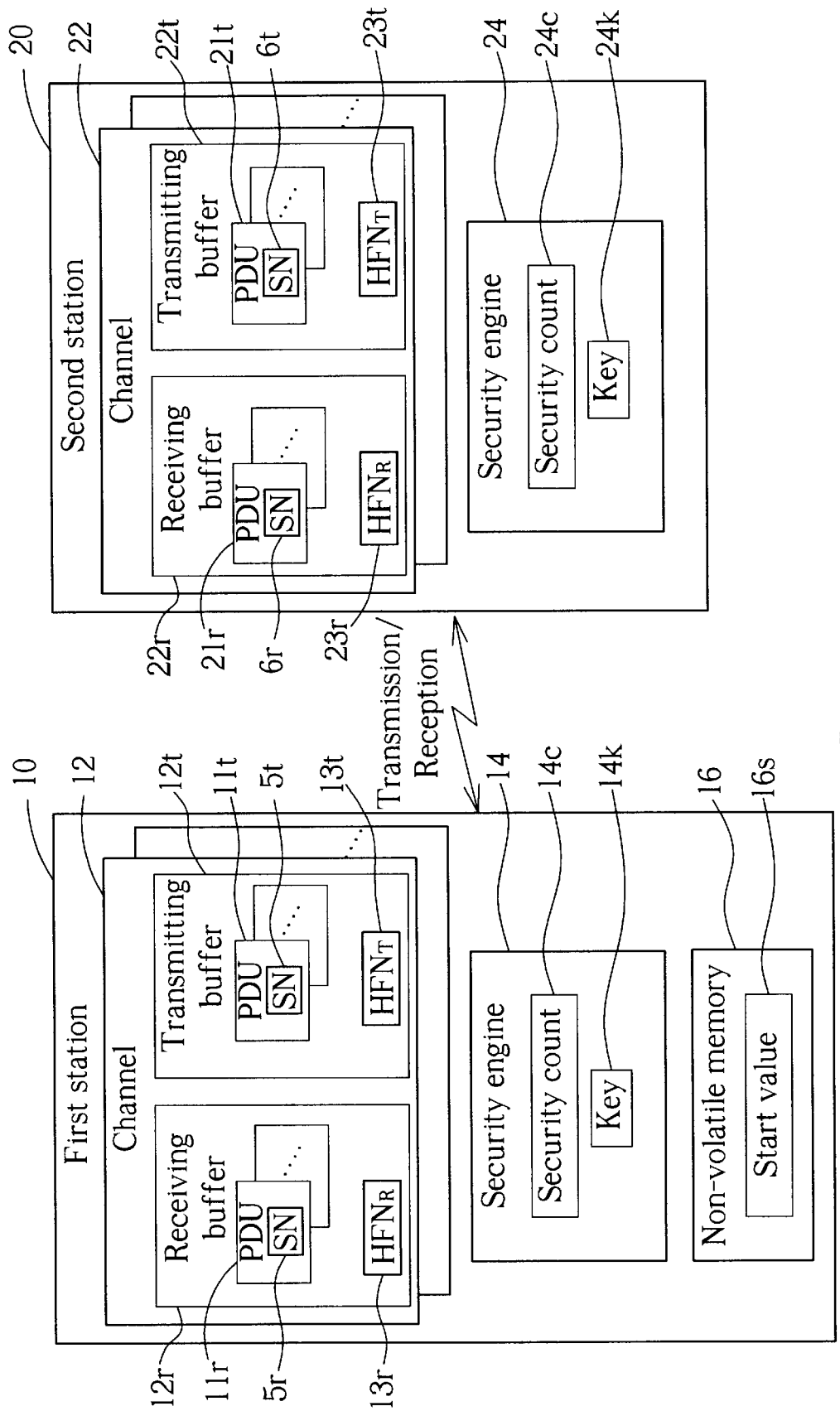
FIG. 1 is a simplified block diagram of a prior art wireless communications system.
Figure 2:
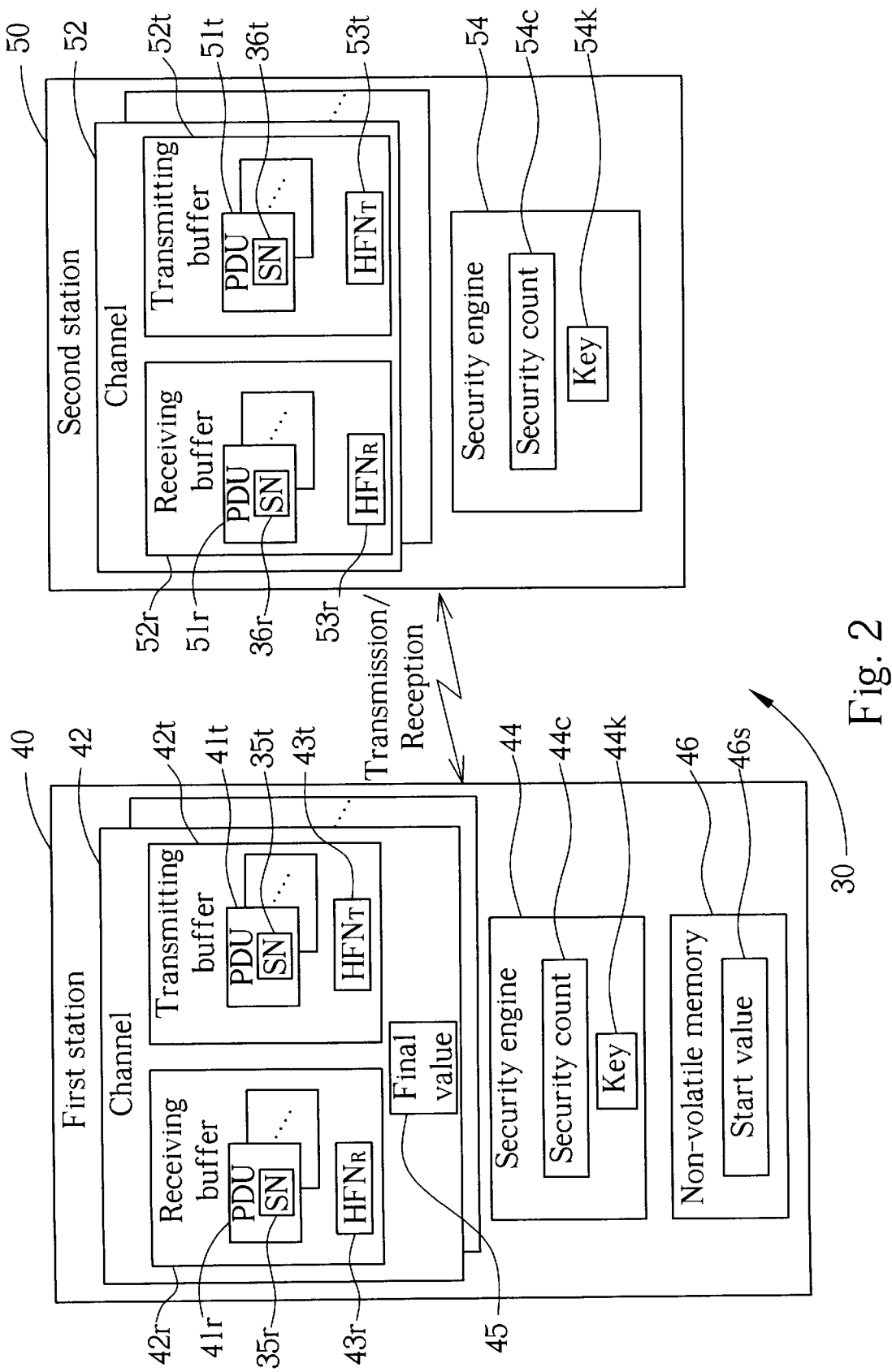
FIG. 2 is a simplified block diagram of a wireless communications system according to the present invention.

Please refer to FIG. 2. FIG. 2 is a simplified block diagram of a wireless communications system 30 according to the present invention. The wireless communications system 30 is much as that of the prior art, as it is the primary objective of the present invention to change the method used for managing a start value 46s. The wireless communications system 30 includes a first station 40 in wireless communications with a second station 50 over a plurality of established channels 42. The first station 40 may be a mobile unit that establishes a channel 42 to effect communications with the second station 50 that is a base station. The second station 50 establishes a corresponding channel 52 for the channel 42 of the first station 40. The first station 40 may also release an established channel 42, in which case the second station 50 releases the corresponding channel 52. Each channel 42 has a receiving buffer 42r and a transmitting buffer 42t. Similarly, on the second station 50, each channel 52 has a receiving buffer 52r and a transmitting buffer 52t. The receiving buffer 42r is used to hold protocol data units (PDUs) 41r received from the second station 50. The transmitting buffer 42t is used to hold PDUs 41t awaiting transmission to the second station 50. A PDU 41t is transmitted along its channel 42 to the second station 50, where it is received and placed into the receiving buffer 52r of the corresponding channel 52. Similarly, a PDU 51t is transmitted along its channel 52 to the first station 40, where it is received and placed into the receiving buffer 42r of the corresponding channel 42. Each PDU 41r, 41t, 51r, 51t has an m-bit sequence number (SN) 35r, 35t, 36r, 36t that indicates the sequential position of the PDU 41r, 41t, 51r, 51t within its respective buffer 42r, 42t, 52r, 52t. Sequentially later PDUs 41r, 41t, 51r, Sit have sequentially higher sequence numbers 35r, 35t, 36r, 36t. As the sequence number 35r, 35t, 36r, 36t has a fixed bit size, the sequence number 35r, 35t, 36r, 36t will rollover to zero when its value exceeds $2^m-1$. The receiving buffers 42r, 52r each have a respective receiving hyper-frame number ($HFN_R$) 43r, 53r that is incremented by one upon detection of such a roll-over event of the sequence number 35r, 36r of received PDUs 41r, 51r. The $HFN_R$ 43r, 53r associated with each received PDU 41r, 51r thus serves as high-order bits (most significant bits) for the sequence number 35r, 36r of the received PDU 41r, 51r. Similarly, each transmitting buffer 42t, 52t has a respective transmitting hyper-frame number ($HFN_T$) 43t, 53t that serves as the high-order, most significant bits of the sequence number 35t, 36t of each transmitted PDU 41t, 51t. The hyper-frame numbers 43r, 43t, 53r, 53t are internally maintained by the first station 40 and second station 50, and are explicitly transmitted only during synchronization events. This is in contrast to the sequence numbers 35t, 36t, which are typically carried by their respective PDUs 41t, 51t.

The first station 40 has a security engine 44 that is used to perform enciphering/deciphering and data integrity checks of the PDUs 41r, 41t. Two of a multiple of inputs into the security engine particularly include an n-bit security count 44c, and a ciphering key 44k. A corresponding security engine 54 is provided on the second station 50, which also uses an n-bit security count 54c and a ciphering key 54k. A PDU 41t is enciphered by the security engine 44 using a distinct security count 44c, and ciphering key 44k. To properly decipher the corresponding received PDU 52r, the security engine 54 must use a security count 54c that is identical to the security count 44c, and a ciphering key 54k that is identical to the ciphering key 44k. Integrity checking of PDUs 41r, 41t, 51r, 51t also utilizes synchronized security counts, but as these integrity security counts are almost invariably smaller than the ciphering security counts 44c, 54c, for purposes of the following discussion it is the ciphering security counts 44c, 54c that are considered.

The ciphering key 44k, 54k is changed relatively infrequently, and involves a somewhat complicated signaling process between the first station 40 and second station 50 to ensure that the respective ciphering keys 44k, 54k remain synchronized (i.e., are identical). The security count 44c, 54c, on the other hand, continuously changes for each PDU 41r, 41t, 51r, 51t along the channel 42, 52. The security count 44c is generated for each PDU 41r, 41t by using the sequence number 35r, 35t of the PDU 41r, 41t as the low-order (least significant) bits of the security count 44c, and the $HFN_R$ 43r, $HFN_T$ 43t, respectively associated with the PDU 41r, 41t, as the high-order bits of the security count 44c. A corresponding process is used by the security engine 54 of the second station 50. For a stream of transmitted PDUs 41t, the security count 44c continuously increases with each PDU 41t. The same is thus also true for streams of PDUs 51t transmitted by the second station 50. The range of security count values 44c used by the various channels 42 may vary widely. All channels 42, however, use the same ciphering key 44k.

Initially, the first station 40 has no established channels 42 with the second station 50. To establish a channel 42 with the second station 50, the first station 40 first extracts a start value 46s from a non-volatile memory 46 of the first station 40, and uses this start value 46s to generate the $HFN_T$ 43t and the $HFN_R$ 43r for the channel 42 that is to be established.

The non-volatile memory 46 is used to permanently store data for the first station 40, and may be an electrically erasable read-only memory (EEROM), a SIM card, or the like, so that the start value 46s is not lost when the first station 40 is turned off. Ideally, the bit size of the start value 46s should be equal to the bit size of the hyper-frame numbers 43t and 43r. In this case, the $HFN_T$ 43t and the $HFN_R$ 43r are simply set equal to the start value 46s. If, however, the start value 46s is x bits in size for m-bit hyper-frame number 43t, 43r, and x is less than m, then the start value 46s is used as the x most significant bits ($MSB_X$) of the hyper-frame numbers 43t, 43r, and the remaining low-order bits of $HFN_T$ 43t and $HFN_R$ 43r are simply cleared. After generating the hyper-frame numbers 43t and 43r by way of the start value 46s, the first station 40 transmits the start value 46s to the second station 50 so that the second station 50 may set the $HFN_R$ 53r and the $HFN_T$ 53t of the corresponding channel 52 equal to the initial value of the hyper-frame numbers 43t and 43r. In this manner, the $HFN_T$ 43t is synchronized with the corresponding $HFN_R$ 53r, and the $HFN_R$ 43r is synchronized with the corresponding $HFN_R$ 53t. As the start value 46s is an x-bit sized number, and the $HFN_T$ 43t is used as the most significant bits of the security count 44c for transmitted PDUs 41t, the start value effectively holds the $MSB_X$ of the n-bit security count 44c, where n is equal to the sum of the bit size of the $HFN_T$ 43t and the bit size of the sequence number 35t. This is also true for the security count 44c for received PDUs 41r, as regards $HFN_R$ 43r.

Many other channels 42 may be established by the first station 40 (or in response to a channel 52 being established by the second station 50) after an initial channel 42 has been established. When establishing a new channel 42 when other channels 42 are already established, the first station 40 first selects the numerically greatest hyper-frame number 43t or 43r from all of the established channels 42. The $MSB_X$ of this numerically greatest hyper-frame number 43r, 43t are extracted to generate an x-bit final value 45. If this x-bit final value 45 is less than $2^X-1$, then the final value 45 is incremented by one. The final value 45 is checked against the start value 46s. If the final value 45 is less than the start value 46s, then the final value 45 is set equal to the start value 46s. The final value 45 is then used as the $MSB_X$ for the $HFN_T$ 43t and the $HFN_R$ 43r of the new channel 42 being established. Synchronization is then performed between the first station 40 and the second station 50 to establish initial values for $HFN_R$ 43r and $HFN_R$ 53r.

Of particular relevance to the present invention, however, the first station 40 may release an established channel 42. When an established channel 42 is released, memory used by the channel 42 is freed. The corresponding receiving buffer 42r and transmitting buffer 42t are thus removed, and the $HFN_R$ 43r and $HFN_T$ 43t are lost. just prior to releasing any channel 42 (that is, as part of the process of releasing the channel 42), regardless of whether or not other channels 42 are concurrently established, the first station 40 first selects the numerically greatest $HFN_T$ 43t or $HFN_R$ 43r concurrently reached by all established channels 42, including the terminal value of the $HFN_T$ 43t and the $HFN_R$ 43r of the channel 42 that is to be released. A terminal value of a hyper-frame number 43r, 43t is the last value reached just before the corresponding channel 42 is released. The $MSB_X$ of this numerically greatest hyper-frame number 43t, 43r are extracted to generate an x-bit final value 45. If this x-bit final value 45 is less than $2^X-1$, then the final value 45 is incremented by one. If the final value 45 is then greater than the start value 46s, the final value 45 is stored in the non-volatile memory 46 as the start value 46s.

Alternatively, upon release of any channel 42, the first station 40 may set the final value 45 equal to the $MSB_X$ of the terminal value of the larger of the $HFN_T$ 43t or the $HFN_R$ 43r of the channel 42 that is being released. If this final value 45 is less than $2^X-1$, then the final value 45 is incremented by one. If the final value 45 is then greater than the start value 46s, the final value 45 is stored in the non-volatile memory 46 as the start value 46s.

Regardless of which of the above methods is used, the end result is that, upon the release of a last channel 42 (after which there will be no established channels 42), the start value 46s will hold a value that is one greater than the highest terminal value reached by the $MSB_X$ of the hyper-frame numbers 43t, 43r of all channels 42 that were established, which is the primary objective of the present invention. To prevent rollover of the start value 46s, the start value 46s is not permitted to exceed $2^X-1$.

By ensuring the start value 46s is consistent with the $MSB_X$ of the largest security count 44c reached by any of the channels 42 of the first station 40, the first station 40 ensures that excessive re-use of security count values 44c is prevented, and that the security count 44c steadily advances across sessions, without falling back to previous values. As changing of the ciphering key 44k depends upon the magnitude of the security count 44c, the first station 40 ensures that the ciphering key 44k is not used for an excessive length of time. This helps to further ensure the security of the communications system 30, as periodic changing of the ciphering keys 44k, 54k makes cracking of the security engines 44, 54 more difficult.

Consider, as an example of the present invention method, that the first station 40 is a mobile phone and the second station 50 is a base station. For the sake of simplicity, it is further assumed that the bit size of the start value 46s equals the bit size of the hyper-frame numbers 43r and 43t. The first station 40 is turned on and establishes an initial channel 42 with the second station 50, beginning a session. A session, in this context, indicates the period of time spanned from the establishing of a first channel 42, to the releasing of a final channel 42. The first channel 42 is, in fact, the very first channel 42 established by the first station 40 with the second station 50, there being no other established channels 42, and is usually in response to the first station 40 being turned on. The final channel 42 is the very last channel release by the first station 40, so that thereafter there are no established channels 42 with the second station 50, which usually occurs just prior to the first station 40 being turned off. Assuming that the start value 46s holds an initial value of 147, the first station 40 will, after being turned on, use the start value 46s as the $HFN_T$ 43t and the $HFN_R$ 43r of the newly established first channel 42. $HFN_T$ 43t for the first channel 42 will thus have a value of 147, as will the $HFN_R$ 43r. Generally speaking, the first channel 42 will usually be a signaling channel 42, which tends to have a relatively low transmission rate of PDUs 41t. Some time later, the first station 40 establishes a data channel 42 with the second station 50. Assuming that the first channel 42 has not transmitted a great number of PDUs 41t, and has received even fewer PDUs 41r, $HFN_T$ 43t will be the larger of the hyper-frame numbers 43t, 43r for the first channel 42, and may have incremented only once, to a value of 148. When establishing the data channel 42, the first station 40 first finds the greatest value of all the hyper-frame numbers 43t, 43r across all established channels 42. There being only one currently established channel 42, the first channel 42, the result of this search yields the value of 148 from the $HFN_T$ 43t of the first channel 42. This value is incremented by one and then compared to the start value 46s, and the larger of the two is selected and used as the $HFN_T$ 43t and $HFN_R$ 43r for the data channel 42. The data channel 42 thus obtains an $HFN_T$ 43t having an initial value of 149, and an HFN 43r that also has the initial value of 149. After undergoing large traffic loads for some time, the data channel 42 is finally released. Due to the high traffic volumes along the data channel 42, the $HFN_R$ 43r for the data channel 42 increased from the initial value of 149 to a terminal value of 231, and is greater than the terminal value of the $HFN_T$ 43t for the data channel 42 (i.e., the data channel 42 received a great deal more PDUs 41r than it transmitted). When the data channel 42 is released, the first station 40 compares the $HFN_R$ 43r of the data channel 42 with the start value 46s. Finding that the $HFN_R$ 43r of the data channel 42 is greater than the start value 46s, the $HFN_R$ 43r is incremented by one and then stored as the start value 46s. The start value 46s thus holds a value of 232. Any subsequently-established channel 42 would thus have an $HFN_T$ 43t and an $HFN_R$ 43r of at least 232.

In contrast to the prior art, the present invention provides for updating a start value stored in non-volatile memory each time an established channel is released. In this manner, the x most significant bits of the largest value reached by the security count for every established channel is preserved in the non-volatile memory. Excessive re-use of security count values is thus prevented, and ciphering keys are not used for an excessive period of time.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for determining a start value to be stored in a memory of a wireless communications device, the start value being x bits in size and used to provide an initial value to an n-bit security count value, the wireless communications device capable of establishing a plurality of channels and capable of releasing established channels, the method comprising:

for at least two channels established by the wireless communications device, obtaining a corresponding terminal value, the terminal value of the corresponding channel being the highest value reached by the x most significant bits (MSBx) of an n-bit security count value associated with the channel;

obtaining a final value that is the greatest value of all the terminal values; and storing a start value in the memory of the wireless device that is at least as large as the final value only when storage of the start value is prompted by a new channel being established, by an established channel being updated, or by an established channel being released.

2. The method of claim 1 wherein if the final value is not greater than a start value previously stored in the memory, then the final value is set to be at least as great as the start value previously stored in the memory.

3. The method of claim 2 wherein the start value stored in the memory is greater than both the final value and the previously stored start value.

4. The method of claim 3 wherein if the final value exceeds a predetermined value, then the final value is set equal to the predetermined value.

5. The method of claim 4 wherein the predetermined value is determined by $2^x$ so as to prevent roll-over of the start value stored in the memory.

6. A method for managing a start value in a wireless communications device, the start value being x bits in size and used to provide an initial value to an n-bit security count value, the wireless communications device capable of establishing a plurality of channels, each channel having an associated n-bit security count value, and capable of releasing established channels, the method comprising:

for an initial established channel, setting the x most significant bits (MSBx) of the n-bit security count value associated with the initial established channel to a first value, the first value being at least as great as the start value stored in a memory of the wireless communications device;

for a subsequently established channel, setting the MSBx of the n-bit security count value associated with the subsequently established channel to a second value, the second value being at least as great as the greatest value reached of all the MSBx of all the n-bit security count values associated with all established channels; detecting for a release of any of the established channels;

prompted by a detected release of any of the established channels when at least another channel is established, generating a third value that is at least as great as the greatest value reached of all the MSBx of all the n-bit security count values associated with all the established channels and the n-bit security count value associated with the released channel; and storing the third value in the memory as the start value.

7. The method of claim 6 wherein the third value stored in the memory is greater than the first value.

8. The method of claim 6 wherein if the third value exceeds a predetermined value, then the third value is set equal to the predetermined value.

9. The method of claim 8 wherein the predetermined value is determined by $2^x$ so as to prevent roll-over of the start value.

10. The method of claim 6 wherein the second value is further set to be at least as great as the start value stored in the memory.

11. The method of claim 6 wherein the third value is further set to be at least as great as the start value stored in the memory.

* * * * *